Sept. 10, 1968  J. ROSA ET AL  3,401,272

FERRORESONANT TRANSIENT SUPPRESSION SYSTEM

Filed Aug. 30, 1965

WITNESSES

INVENTORS
John Rosa, Michael Bryant
and Andrew S. Sweetana, Jr.
BY
ATTORNEY

United States Patent Office 3,401,272
Patented Sept. 10, 1968

3,401,272
FERRORESONANT TRANSIENT SUPPRESSION SYSTEM
John Rosa and Michael Bryant, Pittsburgh, Pa., and Andrew S. Sweetana, Jr., Bloomington, Ind., assignors to Westinghouse Electric Corporation, Pittsburgh, Pa., a corporation of Pennsylvania
Filed Aug. 30, 1965, Ser. No. 483,605
11 Claims. (Cl. 307—93)

ABSTRACT OF THE DISCLOSURE

A circuit arrangement for anticipating a ferroresonant condition by sensing a predetermined increase of magnetic flux in the core of a potential transformer, and developing a signal in response thereto to place an energy dissipating load across at least a portion of the transformer. The increase of flux in the transformer core is detected by a sensing reactor inductively coupled to the core, the sensing reactor being designed to saturate when the magnitude of flux in the transformer core reaches a predetermined, alarm level which level is substantially below the core's saturation level.

---

The present invention relates generally but not exclusively to potential transformer systems of the capacitive voltage divider type and particularly to a circuit means in combination therewith that anticipates conditions in the system that give rise to ferroresonant oscillations and effectively damps out these oscillations should they occur.

The function of a capacitive potential device is to faithfully transform high voltage or extra high voltage to low voltage with such accuracy in amplitude and phase angle that it can be used for revenue indicating and local metering, and with enough power to operate relays and instruments.

Generally, the basic system employs a plurality of capacitances connected between a high voltage line and ground to form a voltage divider network. The desired voltage level can be obtained by use of an iron core reactor coil connected in series with a voltage tap located between appropriate capacitors and a stepdown transformer primary. The reactor coil resonates with the equivalent capacitance of the divider network thereby insuring correct phase relationship between primary and secondary voltages. The transformer reduces the voltage to the usually desired 115 and 66.4 volts.

Any system composed of capacitors and iron core inductances by its very nature is subject to ferro-resonant oscillation. The triggering mechanism by which ferroresonance occurs is, in almost all cases, caused by transient phenomena subjecting the iron core inductances to a sudden voltage change which brings about a current surge and accordingly establishes saturation in the iron core components and the accompanying change of inductances. Such voltage changes can occur by switching a line into service, by clearing of a secondary short circuit, or by reclosing operations. Since the instant of closing occurs at different times on the curve of an alternating current waveform, the initial conditions of the circuit will determine the appearance of ferroresonance. Hence, ferroresonance is a random occurrence.

Ferroresonant oscillations are of generally two types, namely, stable subharmonic oscillations and sustained overvoltage relaxation oscillations. The former are characterized by subharmonic oscillations occurring at a submultiple of the line frequency. Relaxation oscillations occur at the system frequency.

Ferroresonance cannot be tolerated in a capacitive potential device since false information would be transferred to relays and revenue meters as well as damaging overvoltages. Eventually the transformer itself would fail due to the sustained overvoltage thereby causing failure of the capacitive potential device itself.

There are several schemes currently being used to damp out ferroresonant oscillations most of which either add a heavy resistive burden permanently or insert a dummy burden after ferroresonant oscillation begins. Tuned filter circuits are also used, and operation of the potential transformer at low levels on the saturation curve is helpful; however, economics and space limitations generally govern the later solution.

Ferroresonance will usually not occur in the circuit if there is enough resistance in the primary or a high wattage burden on the secondary for the purpose of energy dissipation. However, the accuracy of the potential device is related inversely to the resistance. As extremely high accuracy (say .3%–400 va.) is obtained, the resistance is kept so low as to require a circuit Q of 30 to 40. This requirement allows little or no damping to take place, particularly with a low burden on the secondary. To load the device with a permanent resistive burden either affects the accuracy class or makes the transformer prohibitively large.

Any tuned circuit used must be carefully designed or the reactive components can affect transient response characteristics. For example, inductance values can constantly change on increasing high currents required to flash a gap used to insert a capacitor in parallel with an inductance coil in circuits designed to establish a parallel resonance when ferroresonance occurs. In other words, a fine point of resonance is difficult to obtain; and indeed, the gap may continue to extinguish and refire causing oscillations.

What is needed is a damping or suppression device that appears disconnected from the circuit during normal operating conditions, but at the slightest hint of ferroresonance is activated or placed in the circuit to consume energy and thereby gradually damp the oscillations. Abrupt removal of the suppression device can shock the system back into oscillation.

It is therefore the principal object of the present invention to provide a simple, inexpensive and reliable suppression circuit in which ferroresonant conditions are quickly detected, and a dummy load is instantly applied to and gradually removed from the secondary of a potential measuring transformer.

Another object of the present invention is to provide a novel ferroresonant detecting circuit that is instantly sensitive to both subharmonic and relaxation oscillations.

Yet another object of the invention is to provide a ferroresonant damping circuit without substantially affecting the metering accuracy of a capacitive potential device.

A further object of the invention is to provide a ferroresonant detecting and damping circuit that senses and damps before a capacitive potential measuring transformer is saturated and before oscillations occur.

Other objects and advantages of the invention will be apparent from the following detailed description taken in connection with the accompanying drawings, in which.

In accordance with the principles of the invention an excessive or distorted primary voltage, or a subharmonic oscillation causes the magnetic flux in the core of a potential transformer to swing beyond the limits reached at nominal operating voltages. Adjacent the transformer and in electrical connection therewith is located a flux detecting reactor which senses the instantaneous value of flux in the transformer and which develops an output signal, through operation of its saturation, the instant the transformer flux exceeds a predetermined (alarm) level. The output signal is then applied to a switching and timing circuit in which a switching device such as a silicon controlled rectifier is operated to insert a heavy resistance load across the secondary of the potential transformer. The timing circuit then allows the resistive load to be in (across the secondary) for several cycles, say 20 to 30, the timing circuit continuously changing the firing angle of the switching device thereby allowing gradual removal of the load. After say about 30 cycles the switching device is completely shut off and appears for practical purposes as an open circuit to the capacitive potential device. The sensing reactor and SCR switching device operate in microseconds thus making it possible to insert the resistive burden before saturation of the potential transformer.

Figure 1:
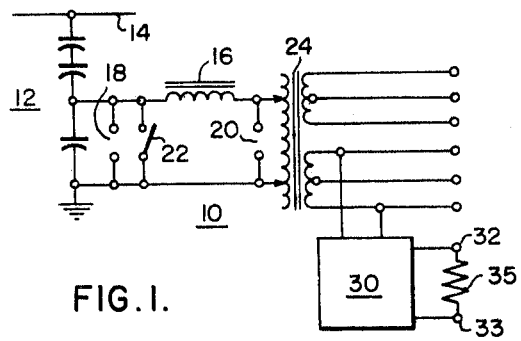
FIGURE 1 is a schematic diagram of a capacitive metering potential device showing the unique sensing and damping device of the present invention connected across one secondary winding of a potential transformer.

In FIG. 1 there is shown a capacitive potential circuit 10 in which a capacitive voltage dividing stack and network 12 is connected between a power line 14, whose voltage is to be measured, and ground. Network 12 includes an iron core reactor 16, excessive voltage protection devices in the form of spark gaps 18 and 20 and a grounding switch 22. Potential circuit 10 further includes the primary winding of a transformer 24 connected in series with reactor 16. Transformer 24 reduces the line voltage to about 115 and 66.4 volts. As mentioned earlier, reactor 16 resonates with the equivalent capacitance of the divider network 12 so that the high voltage on line 14 is faithfully transformed with such accuracy in amplitude and phase angle that it can be used for revenue recording and local metering which is accomplished in the secondary circuit of transformer 24, and which forms a burden on line 14.

Across the lower 115 volt secondary winding of transformer 24, as shown in FIG. 1, is connected the novel sensing, damping and timing circuit 30 of the present invention which is designed to insert low resistance load 35 upon sensing an incipient ferroresonant condition in transformer 24. Load 35 is a voltage dropping resistor chosen to consume and dissipate the electrical energy flowing therethrough; load 35 immediately dampens the ferroresonant oscillations in transformer 24 while timing circuit 60 (FIG. 5) gradually removes load 35 from the transformer in a manner to be more fully explained hereinafter.

Figure 5:
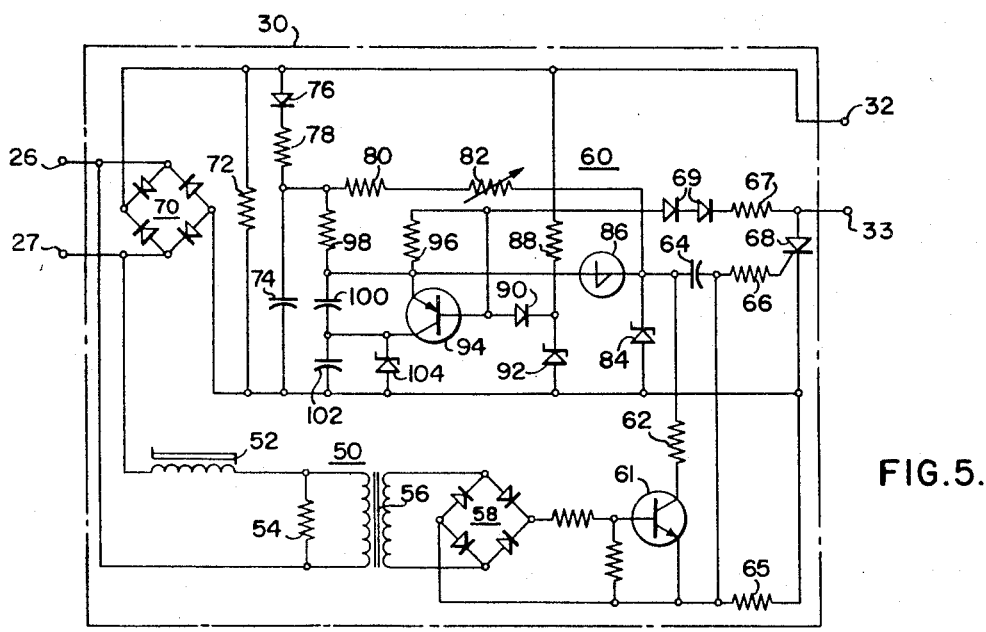
FIG. 5 is a schematic diagram of a sensing circuit in combination with a damping and timing circuit constructed in accordance with principles of the present invention.

FIG. 5 shows novel circuit arrangement 30 which includes flux sensing circuit 50 activating a switching device which may take the form of silicon controlled rectifier 68. Circuit arrangement 30 includes further the timing circuit 60 that gradually removes load 35 from the circuit.

Figure 2:
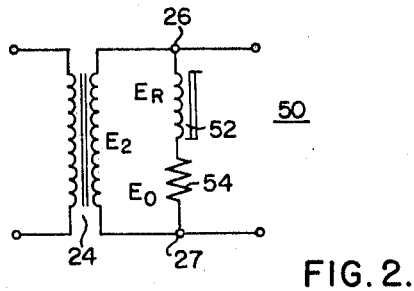
FIG. 2 is a schematic diagram of the ferroresonance sensing arrangement constructed in accordance with the principles of the present invention.
Figure 4:
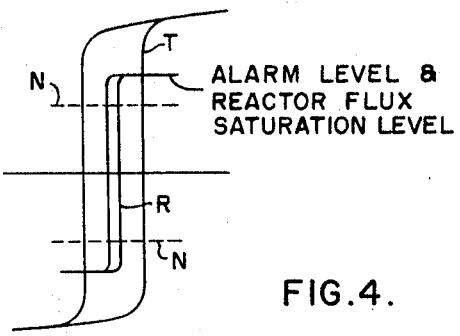
FIG. 4 is a set of square wave hysteresis loops showing the magnetic flux swings in the secondary of a potential transformer and an associated sensing reactor, re-respectively.

The flux sensing circuit 50, as shown in FIGS. 2 and 5, comprises a sensing reactor 52 and resistor 54 connected in series across tap 26 and 27 on the secondary of potential transformer 24. Sensing reactor 52 can comprise a simple winding wound on a magnetic core having a square wave hysteresis loop, as shown in FIG. 4, and is identically flux linked (inductively coupled) to potential transformer 24 so that when the main flux in the core of transformer 24 rises above a preset alarm level the flux in the core of reactor 52 quickly reaches saturation towards the end of the half cycle of alternating current flow. The core cross sectional area of sensing reactor 52 and the number of turns of the winding are chosen so that the flux of reactor 52 will reach saturation flux level when the flux level of transformer 24, which the reactor monitors and is in flux linkage therewith, reaches an alarm level, but not a full saturation level. In other words, reactor 52 is designed to be substantially fully saturated when the amount of flux in the core of transformer 24 is merely above a predetermined minimum level. Reactor 52 senses this minimum level of flux immediately and instantly applies a signal to SCR switch 68, which is normally open, which places load 35 across transformer 24. Load 35 can be an adjustable resistor.

The flux linkage between transformer 24 and sensing reactor 52 is best shown in FIG. 4. The inner square wave hysteresis loop R depicts the saturation capability of reactor 52 in comparison with that of transformer 24 which is shown by hysteresis loop T. As explained above, and as shown in FIG. 4 of the drawing, reactor 52 is so designed that it reaches saturation level when monitored transformer flux reaches alarm level which exceeds by a specified margin the highest value of flux in the core of transformer 24 reached at nominal primary voltages; this value is shown by dashed line N in FIG. 4. As long as the transformer flux stays under the alarm level (as shown in FIG. 4), the reactor flux will remain under saturation level and the impedance of reactor 52 will support the entire secondary voltage of transformer 24, the voltage across low resistance 54 being negligible. The instant the flux of transformer 24 exceeds the alarm level, the core of reactor 52 saturates and the impedance of reactor 52 ceases to support the secondary transformer voltage which then falls entirely across resistor 54 connected in series therewith.

Figure 3:
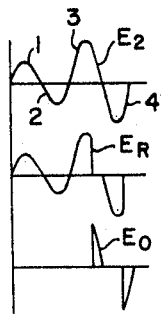
FIG. 3 is a pictorial diagram of the waveforms representing the voltages in the respective components shown in FIG. 2.

The voltages across the secondary of transformer 24, reactor 52 and series resistor 54 are respectively labeled in FIGS. 2 and 3 as $E_2$, $E_R$ and $E_O$. Under normal operating conditions $E_2=E_R$, and $E_o=0$; waveforms 1 and 2 (FIG. 3) show normal voltage swings that produce a flux in transformer 24 that is below alarm level. With the event of ferroresonance, the half cycles 3 and 4, as illustrated, produce a flux level in transformer 24 that exceeds the alarm level; $E_2$ now equals $E_o$ and $F_R$ falls to zero near the center of the half cycle as shown in FIG. 3. The voltage $E_2$ that now appears across resistor 54 is applied to coupling transformer 56, and rectified by diode bridge 58. The DC output from bridge 58 turns on transistor 61, which is ordinarily in a biased off condition, which in turn discharges capacitor 64 through resistor 62 thereby turning on SCR switch 68 in a manner to be more fully described hereinafter in conjunction with FIG. 5.

During normal operation, the 115 volt output from the secondary of transformer 24 is applied through terminal 26 and 27 (FIG. 5) to full wave rectifier bridge 70. The DC output from bridge 70 is applied across resistor 72 and across capacitor 74, resistor 78, and diode 76 connected in series. The D.C. output charges capacitor 74 to about 160 volts thereby maintaining a smooth DC voltage for the components in the circuit arrangement connected to capacitor 74.

With no output from ferroresonance detecting circuit 50 (FIG. 5), transistor 61 is cut off, as mentioned earlier, and capacitor 64 charges through diode 76, resistors 78, 80, 82 and 65 to an approximate voltage level of 47 volts limited by diode 84 which may be of the Zener type. Capacitor 64 remains charged during normal operation of metering potential device 10. Simultaneously, capacitors 100 and 102 charge through resistor 98. Capacitor 102 is of a small value and rapidly charges to a voltage level of about 27 volts limited by diode 104 which may also be of the Zener type.

Transistor 94 is connected across capacitor 100 and is cut off during most of the period of each half cycle when diode 92 is conducting and the base of transistor 94 is more positive than the emitter. Near the end of each half cycle when the voltage at the DC output terminals of the bridge rectifier 70 drops below about 43 volts, diode 92 ceases to conduct and the base of transistor 94 goes negative with respect to its emitter. Transistor 94 conducts and capacitor 100 thus discharges to zero at the end of each half cycle, following the shape of the DC waveform.

The potential on capacitor 64 opposes the potential on capacitors 100 and 102 across diode 86, which may be a Shockley or similar type of four layer diode in which a breakdown voltage reduces its impedance to substantially zero. The capacitor 64 potential (47 volts limited by diode 84) plus the breakdown potential (approximately 20 volts) needed for diode 86 to conduct is greater than the voltages across capacitors 100 and 102. Under these conditions, SCR 68 will not fire and thus is essentially an open circuit and load 35 remains out of the circuit.

If the main flux of potential transformer 24 rises above the preset or alarm level, a signal is applied to the base emitter of transistor 61 as explained earlier, transistor 61 conducts and capacitor 64 discharges through resistor 62. With the potential removed from capacitor 64, the voltages on capacitors 100 and 102 exceed the breakdown voltage (20 volts) of diode 86; diode 86 thus conducts and capacitors 100 and 102 discharge through diode 86, capacitor 64 and resistor 66 to the gate of SCR 68 which, in turn, turns on to connect load 35 to transformer 24 through rectifier bridge 70.

SCR 68, in an on condition, also biases transistor 94 on via resistor 67 and diodes 69 which discharges capacitor 100 and continues to discharge capacitor 100 every time SCR 68 fires. The SCR turns off at every voltage zero of the AC cycle. At the beginning of the next half cycle SCR 68 will fire again as capacitor 64 is only slowly charging via resistor 80 and adjustable resistor 82 while capacitors 100 and 102 charge fast and overtake the charge of 64 at an early part of the half cycle causing diode 86 to break down and conduct again. Capacitor 64 continues to charge, however, while capacitors 100 and 102 charge and discharge. As the voltage across capacitor 64 builds up, as determined by the setting of resistor 82, capacitor 100 has to attain a greater voltage every successive half cycle, obviously, since its potential is opposed by that of capacitor 64 plus the breakdown voltage of diode 86. Thus SCR 68 fires later in each half cycle of operation and after several half cycles, the potential across capacitor 64 is enough to prevent diode 86 from breaking over and firing the SCR altogether. Damping load 35 is then removed from the secondary winding of transformer 24.

At the end of every half cycle, if capacitor 100 is not discharged due to SCR 68 firing, capacitor 100 will discharge as the voltage across diode 92, which may be of the Zener type, falls to zero turning on transistor 94.

Diode 92 limits the capacitive voltage on transistor 94 thereby protecting it from excessive potentials. Diode 84 provides a similar protection for transistor 61. A second level of protection for transistor 94 is obtained at the sum of the breakdown voltage of diode 86 and the voltage of diode 92 which amounts to approximately 63 volts. Overvoltage protection for SCR 68 and input rectifiers 70 may be provided for by similar means, or in any desired manner.

The variation of variable resistor 82 adjusts the charging rate of capacitor 64 and thereby the number of cycles of operation before it reaches that potential necessary for blocking the potentials developed by capacitors 100 and 102 and the consequent turning off of SCR switch 68.

In view of the above description it should now be apparent a unique circuit arrangement has been developed that is particularly useful in capacitive potential metering arrangements in which ferroresonance can occur. The novel arrangement disclosed and described herein provides a means for quickly sensing and very rapidly suppressing such ferroresonance without the necessity of permanently placing a load on the metering arrangement. In fact, the novel circuit described herein has almost negligible current drain on the arrangement while the arrangement is operating under normal conditions; thus there is no interference with metering accuracy, yet the device disclosed allows for instant response, and ease of adjustment of desertion time and connected load with no manual manipulation of components on the high voltage side of the potential transformer. Further, the unique arrangement described and disclosed herein is inexpensive, simple, reliable and small in size permitting a surety of operation and ease of maintenance heretofore unavailable in ferroresonance suppression art.

Though the invention has been described with a certain degree of particularity, it is to be understood that the present disclosure has been made by way of example only and that numerous changes in details, combination and arrangement of components may be accomplished without departing from the spirit and scope of the invention.

We claim as our invention

1. In a capacitor potential device including capacitive voltage divider means and a potential transformer having a magnetic core, means for sensing the magnetic flux in the transformer core, said sensing means being inductively coupled to the transformer core, and means responsive to an increase in said flux above a predetermined level for substantially instantaneously connecting a load to the transformer and for thereafter slowly disconnecting said load.

2. In a capacitor potential device including capacitive voltage divider means and a potential transformer having a magnetic core, means for sensing the magnetic flux in the transformer core, said sensing means being inductively coupled to the transformer core, and means actuated in response to an increase in said flux to a level above the normal maximum flux and below the level at which the core saturates for substantially instantaneously connecting a load to the transformer and for thereafter slowly disconnecting said load.

3. In a capacitor potential device including capacitive voltage divider means and a potential transformer having a magnetic core, flux sensing means comprising a reactor having a magnetic core and a resistor connected in series across a winding of said transformer, the reactor being inductively coupled to the transformer core, the reactor core being unsaturated under normal operating conditions of the transformer and being adapted to saturate when the flux in the reactor core reaches a level corresponding to a predetermined level of flux in the transformer core which is below the flux at which the transformer core saturates, and means responsive to the voltage across said resistor for substantially instantaneously connecting a load to the transformer and for thereafter slowly disconnecting said load.

4. In a capacitor potential device including capacitive voltage divider means and a potential transformer having a magnetic core, flux sensing means comprising a reactor having a magnetic core and a resistor connected in series across a winding of said transformer, the reactor being inductively coupled to the transformer core, the reactor core being unsaturated under normal operating conditions of the transformer and the resistor being such that a negligibly small voltage appears across the resistor under normal conditions, the reactor core being adapted to saturate when the flux in the reactor core reaches a level corresponding to a level of flux in the transformer core which is above the maximum normal flux in the transformer and below the flux at which the transformer core saturates, and means actuated in response to the appearance of a substantial voltage across said resistor for substantially instantaneously connecting a load to the transformer and for thereafter slowly disconnecting said load.

5. In a capacitor potential device including a capacitive voltage divider and a potential transformer having a magnetic core, semiconductor switch means for connecting a load to said transformer, said switch means being normally non-conductive, means for sensing the flux in said transformer core and for providing a signal when said flux exceeds a predetermined level, said sensing means being inductively coupled to the transformer core, and means responsive to said signal for rendering said switch means conductive to substantially instantaneously connect the load to the transformer and for thereafter rendering the switch means conductive for several successively shorter periods to effect gradual disconnection of the load.

6. In a capacitor potential device including a capacitive voltage divider and a potential transformer having a magnetic core, a silicon controlled rectifier for connecting a load to said transformer, said rectifier being normally non-conductive, reactor core means for sensing the flux in said transformer core and for providing a signal when said flux exceeds an alarm level, said reactor core means being inductively coupled to the transformer core, and a transistor-diode circuit means responsive to said signal for rendering said rectifier conductive to substantially instantaneously connect the load to the transformer and for thereafter rendering the rectifier conductive for several successively shorter periods to effect gradual disconnection of the load.

7. In a capacitor potential device including a capacitive voltage divider and a potential transformer having a magnetic core, means for sensing the magnetic flux in the transformer core, said means having a square wave hysteresis loop and saturation curve substantially smaller than that of the transformer core, said means being in substantially identical flux linkage with the transformer, said means producing a signal in response to an increase in the flux of the transformer core above a preset level, circuit means responsive to said signal for substantially instantaneously connecting a load to the transformer and for thereafter slowly disconnecting the load.

8. In a capacitor potential device including a capacitive voltage divider and a potential transformer having a magnetic core, semiconductor switch means for connecting a load to said transformer, said switch means being normally non-conductive, means for sensing the flux in said transformer core and for providing a signal when said flux exceeds a predetermined level, said sensing means being inductively coupled to the transformer core, a transistor circuit arrangement responsive to said signal for rendering said switch means conductive to substantially instantaneously connect the load to the transformer, said switch means becoming non-conductive at zero voltage for every cycle of operation, said transistor circuit arrangement further providing a timing means that continuously changes the angle at which the switch means become conductive for several cycles of operation to allow gradual removal of the load.

9. The combination recited in claim 1 in which the means responsive to an increase in flux includes a timing circuit comprising an electrical energy storage means, a semiconductive means for discharging said energy storage means to a switch device for rendering said switch conductive when said semiconductive means is conductive, said semiconductive means having a non-conductive state when a forward voltage thereacross is less than a predetermined level and a conductive state when the voltage thereacross exceeds said predetermined level, said energy storage means operative to provide a forward voltage on said semiconductive means, means for back biasing said semiconductive means to block discharge of said energy storage means through said semiconductive means, means for rendering said back biasing means inoperative to allow said forward voltage to exceed said predetermined level and render said switch conductive, said switch operative to remain conductive until said back biasing means is made operative to render said semiconductive means non-conductive.

10. The combination recited in claim 1 in which the means responsive to an increase in flux includes a timing circuit comprising a first electrical energy storage circuit, a diode means, a switch device and a second electrical energy storage circuit for biasing said diode in an off state, said diode being in an off state when a forward voltage thereacross is less than a predetermined level and an on state when the voltage thereacross exceeds said predetermined level, said first circuit being operative to provide a forward voltage on said diode and to apply a voltage to said switch device through said diode to render said device conductive when said second circuit removes the bias from said diode and said forward voltage exceeds said predetermined level, said device operative to remain conductive for several cycles of operation until said second circuit reestablishes said bias to render said diode non-conductive.

11. The combination recited in claim 1 in which the means responsive to an increase in flux includes a timing and switching circuit arrangement in which a switch means is instantly turned on and gradually turned off comprising first and second transistor circuits, a four layer diode connected between said circuits, said second circuit operative to instantly turn on said switch means upon receipt of a signal by discharging a first capacitor connected between said diode and said switch means, said diode being operative to conduct and discharge at least one second capacitor connected in said first circuit allowing discharge current to flow through said diode and capacitor to said switch means, said second capacitor operative to fully charge at the beginning of each half cycle of operation and discharge through said diode and said first capacitor for each half cycle of operation while said first capacitor continuously charges, said second capacitor being operative to attain a greater charge for each successive half cycle until said first capacitor is charged to a voltage level that blocks the discharge of said second capacitor through said diode, said switch means being turned off when said second capacitor ceases to discharge through said diode.

References Cited

UNITED STATES PATENTS

| | | | |
|---|---|---|---|
| 2,005,147 | 6/1935 | Langguth et al. | 317—9 |
| 3,209,207 | 9/1965 | La Sota et al. | 317—50 |
| 3,211,929 | 10/1965 | Prines et al. | 307—93 |
| 3,238,391 | 3/1966 | Pearson | 307—93 |
| 3,238,419 | 3/1966 | Heft et al. | 317—33 |

MILTON O. HIRSHFIELD, *Primary Examiner.*

W. E. RAY, *Assistant Examiner.*